H. H. ARMSTRONG.
OXYGEN AND ACETYLENE TORCH.
APPLICATION FILED NOV. 14, 1914.
1,176,017.
Patented Mar. 21, 1916.
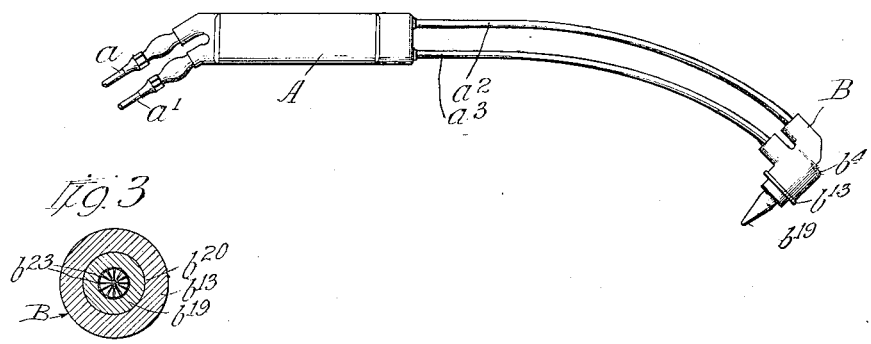
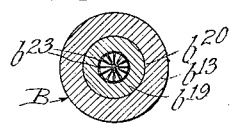
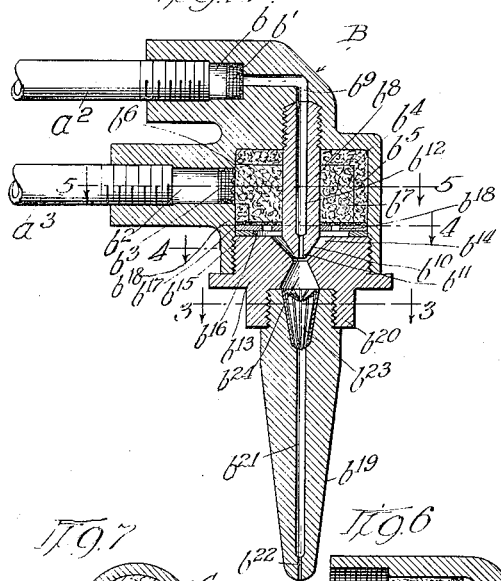
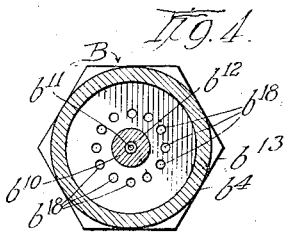
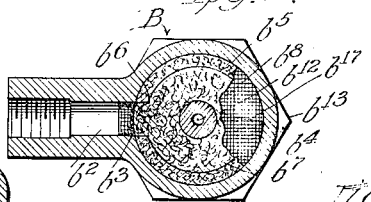
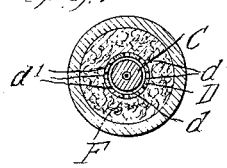
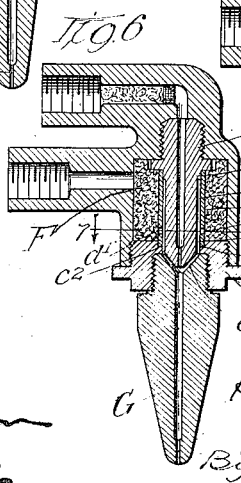
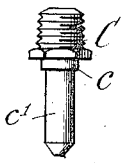
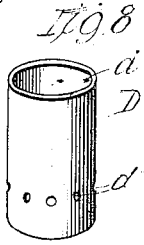
Witnesses:
Arthur W. Carlson
Robert F. Weir
Inventor:
Harry Howard Armstrong
By Arthur F. Durand
Atty.

UNITED STATES PATENT OFFICE.

HARRY HOWARD ARMSTRONG, OF CHICAGO, ILLINOIS, ASSIGNOR TO FIDELITY BRASS MANUFACTURING COMPANY, OF CHICAGO, ILLINOIS, A CORPORATION OF ILLINOIS.

OXYGEN AND ACETYLENE TORCH.

1,176,017.  Specification of Letters Patent.  Patented Mar. 21, 1916.

Application filed November 14, 1914. Serial No. 872,090.

*To all whom it may concern:*

Be it known that I, HARRY HOWARD ARMSTRONG, a citizen of the United States of America, and resident of 4011 Kenmore avenue, Chicago, Cook county, Illinois, have invented a certain new and useful Improvement in Oxygen and Acetylene Torches, of which the following is a specification.

My invention relates to torches for burning oxygen and acetylene gas to produce a flame of high temperature for use in metal work, such as brazing, welding, etc., and for cutting pipes or other metal articles.

Generally stated, the object of my invention is to provide a novel and highly efficient torch of the foregoing general character.

Special objects are to provide novel and improved means for controlling the different gases as they pass through the head of the torch, and before they are allowed to combine and enter the nozzle from which they finally escape to form the flame; to provide a novel and improved construction and arrangement involving an outer nozzle which is readily removable, and an inner removable nozzle for the oxygen, the two nozzles being in line with each other, and the construction being such that the removal of both nozzles and the other interior parts is easily and conveniently accomplished without disturbing any of the pipe connections; to provide a novel and simple construction which will tend to produce a more perfect mixture of the gases before they reach the discharge nozzle; and to provide certain details and features of construction and combinations tending to increase the general efficiency and certainty of operation of an oxygen and acetylene torch of this particular character.

To these and other useful ends my invention consists in matters hereinafter set forth and claimed.

In the accompanying drawings Figure 1 is a side elevation of an oxygen and acetylene torch embodying the principles of my invention. Fig. 2 is an enlarged sectional view of the head and nozzle of said torch. Fig. 3 is a detail section on line 3—3 in Fig. 2. Fig. 4 is a section on line 4—4 in Fig. 2. Fig. 5 is a section on line 5—5 in Fig. 2. Fig. 6 is a view similar to Fig. 2, on a smaller scale, showing a different form of my invention. Fig. 7 is a section on line 7—7 in Fig. 6. Fig. 8 is an enlarged perspective of the perforated sleeve through which the acetylene gas passes in the construction shown in Fig. 6. Fig. 9 is a perspective of the inner nozzle shown in Fig. 6.

As thus illustrated, and referring to Figs. 1 to 5 inclusive, it will be seen that my invention comprises a handle A to which are connected the oxygen and acetylene flexible pipes $a$ and $a^1$ for supplying the gases. The other end of said handle is provided with metal tubes or pipes $a^2$ and $a^3$ which are curved downwardly to connect with the metal head B at the other end thereof. This head is provided with a chamber $b$ containing a screen $b^1$ for the oxygen, the threaded end portion of the pipe $a^2$ being screwed into this chamber. A similar chamber $b^2$ is provided with a similar screen $b^3$ for the acetylene gas, the pipe $a^3$ having its threaded end portion screwed into the outer end portion of this chamber. The said head is formed with a relatively large chamber $b^4$ containing a lining $b^5$ of some suitable noncombustible and heat resisting material, provided at one side with an opening $b^6$ which registers with the screen $b^3$, thereby permitting the admission of the acetylene gas. The heat insulating and porous and non-inflammable material $b^7$ is employed for filling the interior of the shell or lining $b^5$, and is packed around the nozzle $b^8$, which latter has its upper end threaded and removably screwed into the head to communicate with the passage $b^9$ leading from the screen $b^1$, whereby the oxygen is discharged through an inner nozzle which projects through the mass of porous and non-inflammable material $b^7$, such as asbestos or any other suitable substance. The lower end of the nozzle $b^8$ is bluntly tapered or beveled at $b^{10}$, and its discharge orifice $b^{11}$ is preferably somewhat smaller than its bore $b^{12}$, whereby the oxygen is discharged in the form of a small jet. A closure in the form of a threaded plug $b^{13}$ is screwed into the threaded lower end portion of the chamber $b^4$ of the head, and extends a distance upwardly therein, being provided with a bluntly tapered recess $b^{14}$ for the lower end of the nozzle $b^8$, it being observed that a slight space is left around the end of the nozzle. A ring $b^{15}$ of suitable insulating material is supported on the plug $b^{13}$ and a perforated metal washer $b^{16}$ is in turn supported by said ring. A screen $b^{17}$ is superimposed upon the said washer $b^{16}$, and is engaged by the lower edge of the shell or lining $b^5$ of the chamber, whereby the acetylene gas passing into the porous material $b^7$ must pass downward through the perforation $b^{18}$ of the washer, after passing through the screen $b^{17}$, and must then escape downwardly around the lower end of the inner nozzle. An outer nozzle $b^{19}$ has its upper end screwed into the threaded socket $b^{20}$ formed in the bottom of the plug $b^{13}$, said nozzle being provided with a bore $b^{21}$, and a relatively small discharge orifice $b^{22}$ at its lower end. The upper end portion of the nozzle $b^{19}$ is recessed to receive the cone-shaped sheet-metal mixer $b^{23}$, which latter is hollow and provided all around with a number of small slots, as shown, through which the two gases must pass before reaching the bore $b^{21}$ of the discharge nozzle, it being observed that the gases are delivered to the larger end of said mixer. Thus it will be seen that the two gases come together in the chamber $b^{24}$ which is formed in the plug $b^{13}$ at a point between the adjacent ends of the two nozzles, and that the two gases are thoroughly mixed at this point, and by their passage through the apertured element $b^{23}$, before reaching the flame at the lower end of the discharge nozzle. The heat is very intense, as is well known, but the materials $b^5$ and $b^7$ serve to prevent the heat from having a dangerous effect on the gases, and prevent the gases from catching fire within the head. In addition, the porous screens and porous material in the path of the acetylene gas serve to prevent the flame from extending back into the passages for this gas.

As shown in Figs. 6 to 9 inclusive, the construction is substantially the same as that previously described, but with the following difference: The inner nozzle C is provided with an offset $c$, and the perforated cylinder D is fitted upon this offset, thereby producing a space $d$ between the sides $c^1$ of said nozzle and the inner surface of said sleeve. The lower end of this sleeve fits into the offset $c^2$ formed in the upper portion of the plug E, which latter is substantially the same as the plug $b^{13}$ previously described. Thus, and with this construction, the acetylene gas passes from the porous material F and then through the perforations $d^1$ of the sleeve D, through the space $d$, and then through the space $e$ between the lower end of the nozzle C and the upper end of the outer nozzle G, which latter is substantially the same as the nozzle $b^{19}$ previously described. It will be observed, therefore, that with this construction the apertured element or gas mixing device $b^{23}$ is not employed between the two nozzles.

With either construction shown and described, both nozzles are easily removed, and by removing the threaded plug ($b^{13}$ or E) practically all of the internal parts can be removed from the head for the purpose of repair or substitution. In each case the porous and non-inflammable and heat insulating materials serve to minimize the possibility of danger from overheating, and serve to prevent the flame from extending back into the gas passages. An annular perforated element ($b^{16}$ or D) is arranged to encircle the inner nozzle to feed one gas to the mixing space at the inner end of the outer nozzle.

I do not limit myself to the exact construction shown and described.

What I claim as my invention is:—

1. A welding torch comprising a head, an outer nozzle removably secured to said head, there being a mixing space at the inner end of said nozzle, separate passages for supplying different gases to said head, and means within the head to protect the gases from ignition and keep them separate until the same are mixed at the inner end of said nozzle, said means including an inner nozzle for one of said gases, arranged to discharge into the inner end of said outer nozzle, and also including a perforated annular element encircling said inner nozzle and porous material for feeding the other gas through said element to said outer nozzle, said material extending around said inner nozzle and being non-inflammable and a non-conductor of heat.

2. A welding torch comprising a head, an outer nozzle removably secured to said head, there being a mixing space at the inner end of said nozzle, separate passages for supplying different gases to said head, and means within the head to protect the gases from ignition and keep them separate until the same are mixed at the inner end of said nozzle, said head having a chamber communicating with one of said passages, said means including an inner nozzle projecting into said chamber, disposed in position to discharge one gas into the inner end of said outer nozzle, and also including an annular perforated element encircling said inner nozzle, said chamber having a filling of porous material held in place by said element, one edge of said element engaging said inner nozzle, said element being supported at its other edge by said head, and the openings of said element serving to feed the other gas to said outer nozzle.

3. A welding torch comprising a head, an outer nozzle removably secured to said head, there being a mixing space at the inner end of said nozzle, separate passages for supplying different gases to said head, and means within the head to protect the gases from ignition and keep them separate until the same are mixed at the inner end of said nozzle, said head having a chamber communicating with one of said passages, said means including an inner nozzle extending into said chamber from the other passage, a coupling member screwed into place on the head to close said chamber, serving to support the inner end of said outer nozzle in position to receive the discharge of one gas from said inner nozzle, said outer nozzle being carried by and removable with said member without disturbing said inner nozzle, and said chamber having filtering means for feeding another gas to said outer nozzle.

4. A welding torch comprising a head, an outer nozzle removably secured to said head, there being a mixing space at the inner end of said nozzle, separate passages for supplying different gases to said head, and means within the head to protect the gases from ignition and keep them separate until the same are mixed at the inner end of said nozzle, said means including an inner nozzle screwed into said head, communicating with one of said passages, a perforated sleeve on said inner nozzle, said sleeve having space between its inner surface and said inner nozzle, said head having a removable member for supporting the lower edge of said sleeve, and non-combustible porous material between said sleeve and the other passage.

5. In a torch, the combination of a head having a chamber therein, an inner nozzle disposed in said chamber and screwed into said head, separate passages for feeding gases to said chamber and nozzle, porous non-combustible and non-heat-conducting material surrounding said nozzle, a coupling member screw-connected to the head to close said chamber, said member having a central opening for the end of said nozzle, means engaging said member to hold said material in place and feed one gas to said opening, and an outer nozzle screw connected to said member and disposed in alinement with said inner nozzle, whereby said nozzles are rigidly connected in non-engaging relation to each other through said head.

6. In a torch, the combination of a head, a detachable inner nozzle, an outer nozzle which is detachable from said head without disturbing said inner nozzle, said nozzles being disposed in alinement and rigidly connected in non-engaging relation to each other through said head, porous non-combustible and non-heat-conducting material surrounding said inner nozzle, separate passages for feeding gases to said inner nozzle and said material, and means to hold said material in place and feed one gas to said outer nozzle, said head and outer nozzle having a screw connection the tightening of which serves to hold said means and material in place.

7. In a torch, the combination of a head, a detachable inner nozzle, an outer nozzle which is detachable from said head without disturbing said inner nozzle, said nozzles being disposed in alinement and rigidly connected in non-engaging relation to each other through said head, porous non-combustible and non-heat-conducting material surrounding said inner nozzle, separate passages for feeding gases to said inner nozzle and said material, and means to hold said material in place and feed one gas to said outer nozzle, said head and outer nozzle having a screw connection the tightening of which serves to hold said means and material in place, said means being in the form of a perforated annular element extending around said inner nozzle.

8. In a torch, the combination of a head having a chamber therein, an inner nozzle disposed in said chamber and screwed into said head, separate passages for feeding gases to said chamber and nozzle, porous non-combustible and non-heat-conducting material surrounding said nozzle, a coupling member screw-connected to the head to close said chamber, said member having a central opening for the end of said nozzle, means engaging said member to hold said material in place and feed one gas to said opening, and an outer nozzle screw connected to said member and disposed in alinement with said inner nozzle, whereby said nozzles are rigidly connected in non-engaging relation to each other through said head, said means being in the form of a perforated annular element extending around said inner nozzle.

9. In a torch, the combination of a head, a detachable inner nozzle, an outer nozzle which is detachable from said head without disturbing said inner nozzle, said nozzles being disposed in alinement and rigidly connected in non-engaging relation to each other through said head, porous non-combustible and non-heat-conducting material surrounding said inner nozzle, separate passages for feeding gases to said inner nozzle and said material, and means to hold said material in place and feed one gas to said outer nozzle, said head and outer nozzle having a screw connection the tightening of which serves to hold said means and material in place, said means being in the form of a perforated annular element extending around said inner nozzle, said element being a perforated cylinder inclosing said inner nozzle, and seats for engaging the opposite ends of said cylinder.

10. In a torch, the combination of a head having a chamber therein, an inner nozzle disposed in said chamber and screwed into said head, separate passages for feeding gases to said chamber and nozzle, porous non-combustible and non-heat-conducting material surrounding said nozzle, a coupling member screw-connected to the head to close said chamber, said member having a central opening for the end of said nozzle, means engaging said member to hold said material in place and feed one gas to said opening, and an outer nozzle screw connected to said member and disposed in alinement with said inner nozzle, whereby said nozzles are rigidly connected in non-engaging relation to each other through said head, said means being in the form of a perforated annular element extending around said inner nozzle, said element being a perforated cylinder inclosing said inner nozzle, and seats for engaging the opposite ends of said cylinder.

11. A torch having a nozzle formed with a recess in the inner end thereof, a tapered sheet-metal mixer in said recess, said mixer being hollow and formed all around with narrow slots for the passage of gases, and means to deliver gases to the larger end of said mixer.

Signed by me at Chicago, Ill., November 10, 1914.

HARRY HOWARD ARMSTRONG.

Witnesses:
RACHAEL J. RICHARDSON,
ROSE E. SEHNEM.